US011093841B2

(12) United States Patent
Baughman et al.

(10) Patent No.: US 11,093,841 B2
(45) Date of Patent: Aug. 17, 2021

(54) MORPHED CONVERSATIONAL ANSWERING VIA AGENT HIERARCHY OF VARIED GRANULARITY

(71) Applicant: International Business Machines Corporation, Armonk, NY (US)

(72) Inventors: Aaron K. Baughman, Silver Spring, MD (US); Gray F. Cannon, Atlanta, GA (US); Stephen C. Hammer, Marietta, GA (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 854 days.

(21) Appl. No.: 15/471,684

(22) Filed: Mar. 28, 2017

(65) Prior Publication Data
US 2018/0285753 A1    Oct. 4, 2018

(51) Int. Cl.
*G06N 5/04*    (2006.01)
*G06F 16/332*    (2019.01)
*G06F 16/36*    (2019.01)

(52) U.S. Cl.
CPC ......... *G06N 5/043* (2013.01); *G06F 16/3329* (2019.01); *G06F 16/367* (2019.01)

(58) Field of Classification Search
CPC .... G06N 5/043; G06F 16/3329; G06F 16/367
See application file for complete search history.

(56) References Cited

U.S. PATENT DOCUMENTS

| 4,872,122 A * | 10/1989 | Altschuler | G06N 5/04 356/432 |
| 5,283,833 A * | 2/1994 | Church | G10L 15/187 379/52 |
| 6,564,196 B1 | 5/2003 | Masuoka | |
| 9,390,376 B2 | 7/2016 | Harrison et al. | |
| 9,495,957 B2 | 11/2016 | Weider et al. | |
| 2003/0126136 A1 | 7/2003 | Omoigui | |

(Continued)

OTHER PUBLICATIONS

Chu-Carroll, "A Multi-Strategy and Multi-Source Approach to Question Answering", 2013 (Year: 2013).*

(Continued)

*Primary Examiner* — Ann J Lo
*Assistant Examiner* — Van C Mang
(74) *Attorney, Agent, or Firm* — Garg Law Firm, PLLC; Rakesh Garg; Anthony V England (57) ABSTRACT

A hierarchy of agents is constructed from a set of agents. Each agent in the hierarchy is trained to answer a question according to a corresponding corpus associated with the agent, which contains a portion of knowledge about a subject-matter. The question is submitted to a first subset of agents, the agents in the first subset occupying a first level in the hierarchy. From a first agent in the first subset, a first answer is propagated to a second agent in a second subset of agents, the first agent computing the first answer using a first portion of knowledge about the subject-matter. to form a first morphed answer, a second answer is added to the first answer, the second answer being computed by the second agent using a second portion of knowledge about the subject-matter. The morphed answer is produced in response to the question.

17 Claims, 7 Drawing Sheets

(56) References Cited

U.S. PATENT DOCUMENTS

| | | | |
|---|---|---|---|
| 2011/0087625 A1 | 4/2011 | Tanner, Jr. et al. | |
| 2011/0270770 A1* | 11/2011 | Cunningham | G06Q 10/10 |
| | | | 705/304 |
| 2015/0193682 A1* | 7/2015 | Baughman | G06F 16/24578 |
| | | | 707/728 |
| 2015/0347900 A1* | 12/2015 | Bell | G06N 5/02 |
| | | | 706/11 |
| 2015/0356181 A1* | 12/2015 | Dettman | G06F 16/9535 |
| | | | 707/728 |
| 2016/0048772 A1* | 2/2016 | Bruno | G06N 20/00 |
| | | | 706/11 |
| 2016/0125751 A1* | 5/2016 | Barker | G06F 16/284 |
| | | | 434/322 |
| 2016/0247068 A1 | 8/2016 | Lin | |

OTHER PUBLICATIONS

Eisman, "A multi-agent conversational system with heterogeneous data sources access", 2016 (Year: 2016).*

Jartuwat Rajruangrabin et al., "Realistic and Robust Head-Eye Coordination of Conversational Robot Actors in Human Tracking Applications", Petra '09, Jun. 9-13, 2009, Corfu, Greece, pp. 1-7.

Nikolaos Mavridis et al., "FaceBots: Robots Utilizing and Publishing Social Information in Facebook", HRI '09, Mar. 11-13, 2009, La Jolla, California, pp. 273-274.

Alessandra Maria Sabelli et al., "A Conversational Robot in an Elderly Care Center: an Ethnographic Study", HRI '11, Mar. 6-9, 2011, Lausanne, Switzerland, pp. 37-44.

* cited by examiner

MORPHED CONVERSATIONAL ANSWERING VIA AGENT HIERARCHY OF VARIED GRANULARITY

TECHNICAL FIELD

The present invention relates generally to a method, system, and computer program product for providing answers to questions or queries arising in a conversation. More particularly, the present invention relates to a method, system, and computer program product for morphed conversational answering via agent hierarchy of varied granularity.

BACKGROUND

Hereinafter, a request for information presented in any correct or incorrect, complete or incomplete, colloquial or formal, grammatical form of a natural language, during a conversation occurring with an illustrative embodiment described herein, is interchangeably referred to as a "question" or "query" unless expressly disambiguated where used. The conversation and the query are presented to the illustrative embodiment in a natural language.

A cognitive system is an artificial intelligence application executing on data processing hardware. Cognitive systems are in a category of technologies that uses natural language processing and machine learning to enable people and machines to interact more naturally to extend and magnify human expertise and cognition. A cognitive system learns from an available body of knowledge (knowledgebase) and answers questions and queries pertaining to the subject-matter domain of the knowledgebase by analyzing the relationships and significant aspects that are expressed in or inferable from the knowledgebase. For example, a knowledgebase of a domain can include structured repository of domain-specific information, such as ontologies, or unstructured data related to the domain, or a collection of natural language documents about the domain.

A cognitive system can also use deep learning and other cognitive techniques to perform sentiment analysis on a given information input. For example, the sentiment analysis can analyze and extract a linguistic tone of the information input, a like or dislike and a degree thereof expressed in the information input, a main subject or a topic being discussed or described in the information input, and many other language-based features of the information input. The information input is human-usable natural language input, such as a natural language text, audio of human speech, and the like.

SUMMARY

The illustrative embodiments provide a method, system, and computer program product. An embodiment includes a method that constructs, a hierarchy of agents from a set of agents, wherein each agent in the hierarchy is trained to answer a question according to a corresponding corpus associated with the agent, the corresponding corpus containing a portion of knowledge about a subject-matter. The embodiment submits the question to a first subset of agents, the agents in the first subset occupying a first level in the hierarchy. The embodiment propagates, from a first agent in the first subset, a first answer to a second agent in a second subset of agents, the first agent computing the first answer using a first portion of knowledge about the subject-matter. The embodiment morphs to form a first morphed answer, by adding to the first answer, a second answer, the second answer being computed by the second agent using a second portion of knowledge about the subject-matter. The embodiment produces, responsive to the question, the first morphed answer.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that often a singular precise answer—as produced by a cognitive system from a single body of knowledge known to the cognitive system—is insufficient or unsatisfactory. Humans are accustomed to, and often desire an answer that includes details at different granularities.

For example, assume that a knowledgebase includes a corpus of information about a tennis tournament being played in city ABC. When a human asks a question—how is the weather going to be tomorrow in ABC city—a presently available cognitive system can easily use the corpus and provide a precise answer which would include the weather forecast for the next day in ABC city. However, the illustrative embodiments recognize that many questions asked by humans are not isolated and self-contained questions. Rather, many questions arise as a part of a conversation and imply a broader meaning than the words of the question would communicate. Accordingly, the answer to such question should also include not only the precise (or fine granularity) answer being sought, but also other information of varying scope (varying granularity) that encompass the context of the conversation in which the question arises.

For example, suppose that during a conversation, a human user has previously expressed curiosity about certain tennis players, where the tournament is being played, and other tennis related matters, and the conversation has led to the user asking "weather?". If a human were responding to the query "weather?", the human would understand that the user is probably interested in the weather at city ABC where the tennis tournament is being played, and that the user is perhaps also interested in a well-rounded answer about the tournament, the players, the schedule, the likelihood of victory of someone, players currently in the news, and so on. For example, weather at city ABC the next day is perhaps the finest granularity answer related to the query, likelihood of the matches being played tomorrow—which are likely affected by the weather—is an answer of a broader granularity that is related to the query, players scheduled to play tomorrow—which are likely affected by the matches being played considering the weather—is an answer of a still broader granularity that is related to the query, news about a specific player who is scheduled to play in the tournament—is an answer of an even broader granularity that is related to the query, and so on.

The illustrative embodiments recognize that a presently available cognitive system will not be able to provide such a well-rounded answer, which includes information at different granularities from the scope of the question. Therefore, a method that can construct a conversational answer of varying granularities, to questions arising in a conversation, will be useful.

The illustrative embodiments recognize that the presently available tools or solutions do not address these needs or provide adequate solutions for these needs. The illustrative embodiments used to describe the invention generally address and solve the above-described problems and other problems related to morphed conversational answering via agent hierarchy of varied granularity.

An embodiment can be implemented as a software application. The application implementing an embodiment can be configured as a modification of an existing cognitive system, as a separate application that operates in conjunction with an existing cognitive system, a standalone application, or some combination thereof.

An agent is an application according to an embodiment. More precisely, an agent is a limited manifestation of certain capabilities of a cognitive system, whereby the agent is able to perform two functions—(i) answer a question according to the scope of the subject-matter domain knowledge associated with the agent, and (ii) assimilate or morph the answers produced by other agents with the agent's own answer. The two functions together produce an answer at a granularity of the agent's scope of subject-matter domain knowledge, and if any other answers are morphed, then the answers at the granularities of such other agents' scopes of respective subject-matter domain knowledge.

An embodiment configures an agent with a portion of a subject-matter domain as the scope of the agent. Specifically, the embodiment configures the agent with a scope of knowledge that pertains to the portion of the subject-matter domain such that the agent is able to answer questions based on the information about the portion of the subject-matter domain.

For example, suppose the subject-matter domain is a tennis tournament. One example agent can be configured with the weather portion of the subject-matter domain such that if a question has any relationship with the weather, the agent can provide an answer based on the weather data of the tennis tournament. Another example agent can be configured with the news portion of the subject-matter domain such that if a question has any relationship with the news, the agent can provide an answer based on the news data of the tennis tournament.

Another example agent can be configured with the geographical portion of the tennis tournament subject-matter domain such that if a question has any geographical aspect, the agent can provide an answer based on the geographical data of the tennis tournament. The geographical agent includes the weather and much more, therefore, the scope of the geographical agent is broader than the weather agent. In this manner, any number of agents can be configured with distinct portions of the subject-matter domain, overlapping portions of the subject-matter domain, and with portions of different scopes.

According to one embodiment, the agents in a set of agents can be assigned different scopes according to an ontology of a subject-matter. The ontology of a subject-matter is hierarchical—with broader terms corresponding to broader knowledge about the subject-matter domain occurring nearer to the root of the ontology and narrower terms corresponding to narrower knowledge about the subject-matter domain occurring nearer to the leaf nodes of the ontology. Accordingly, the agents that correspond to the broader ontology terms comprise broader scope and coarser granularity, as compared to those agents that correspond to narrower ontology terms and comprise narrower scope and finer granularity.

Furthermore, another embodiment organizes the agents in the set of agents, which corresponds to an ontology of a subject-matter, in the hierarchical manner of the ontology. Stated another way, according to such an embodiment, the agents corresponding to the terms of an ontology are also arranged in an ontology-like hierarchy—the agents that correspond to the broader ontology terms and which comprise broader scope and coarser granularity, appear closer to (or as) the root of an agent-hierarchy; and agents that correspond to narrower ontology terms and which comprise narrower scope and finer granularity appear closer to (or as) the leaf nodes of the agent hierarchy.

An embodiment trains an agent. The training of an agent comprises (i) training the agent to correctly identify, from a training conversation in the training data, a context that is applicable to a training question, regardless of whether the question and/or the conversation uses correct grammar of the natural language of the training conversation, (ii) training the agent with training data to correctly answer training questions according to the scope of the subject-matter domain knowledge associated with the agent, and (iii) training the agent to correctly assimilate or morph the training answers produced by other agents with the agent's own training answer.

In one embodiment, the agent is trained to recognize the context of the question by keeping a portion of the already-occurred conversation in memory. For example one embodiment maintains a sliding window over the conversation, as the conversation unfolds. The agent keeps that portion of the conversation in memory that is within the window. The agent analyzes the portion in the window to extract contextual references. The agent then uses the contextual references as the context in which the question is being asked.

As another example, another embodiment associates a weight with a past portion of the conversation, the weight being inversely related to the distance in time between the question and a past portion of the conversation. The agent analyzes one or more weighted past portions for contextual references. The agent assigns the contextual references from a portion the weight associated with the portion. In this manner, the old contexts fade away as new contexts emerge in the conversation.

Furthermore, an embodiment trains an agent to compute a confidence value (also referred to herein as a weight) in an answer, based on the portion of subject-matter domain knowledge available to the agent. For example, an agent that is being trained for weather related questions will produce answers to weather related questions with high confidence as compared to answers to player-related questions using the weather-related portion of the knowledge associated with the example tennis tournament subject-matter domain.

Additionally, another embodiment trains the agent to support an answer with evidence from the portion of the knowledgebase that is available to the agent. For example, if the weather agent provides a weather related answer, the evidence may include the data obtained from a weather data source which the agent used to compute the answer.

Using these and other similarly purposed methods, an agent is trained to recognize the correct training context of the training question from the training conversation. Using the training question in the analyzed context, the agent is trained to produce a correct training answer at a granularity of the agent's scope of subject-matter domain knowledge, and if any other training answers are morphed, then the training answers at the granularities of such other agents' scopes of respective subject-matter domain knowledge. The final morphed answer produced by an agent thus includes either the answer alone (A), or the answer and a confidence value (A,C), or the answer and evidence (A,E), or the answer with the confidence and the evidence (A,C,E). Any reference to (A,C,E) hereinafter is a reference to either (A), or (A,C), or (A,E), or (A,C,E) depending on the implementation of the embodiments.

An embodiment trains several agents in a set of agents at different in this manner. The embodiment introduces the trained agents into an ontology-based agent-hierarchy for answering actual questions from the users.

Known natural language processing (NLP) engines can be employed to convert spoken questions into text, textual answers into speech, or both.

The user engages in a conversation with an implementation of the agent-hierarchy. During the conversation, the user communicates a need for certain information—e.g., in the form of a correctly/incorrectly, completely/incompletely formed question. One or more agents at leaf nodes in an agent-hierarchy receive the question. The agents recognize the context of the question from the conversation. Using the question in the analyzed context, the leaf node agents produce answers (A,C,E) at a granularity of the agents' scopes of subject-matter domain knowledge. One or more (A,C,E) answers propagate upwards towards the next higher agents in the agent-hierarchy. A higher agent produces an (A,C,E) based on the agent's scope as well as by morphing into the agent's own answer other (A,C,E) answers received from the corresponding lower agents. The final morphed answer produced by the higher agent thus includes (A,C,E) where the answer A is of varying granularity, supported by evidence E that includes evidence from several agents from their respective scopes.

This propagation upwards towards coarser granularity, and morphing of lower agent answers continues until either the root agent is reached in the agent-hierarchy, or an (A,C,E) from an intermediate agent meets a user's criteria for a satisfactory answer. When the propagation stops by reaching the root agent, the root agent outputs the final morphed answer ($A_{root}$, $C_{root}$, $E_{root}$) as the well-rounder multi-granularity response to the question. When the propagations tops at an intermediate agent x, the intermediate agent outputs the final morphed answer ($A_x$,$C_x$,$E_x$) as the well-rounder multi-granularity response to the question.

The propagation may stop at an intermediate agent when a user-specified confidence is achieved in the final morphed answer, a user-specified scope has been covered by the final morphed answer, user-specified evidence has been produced by some agent, or some other user-specified condition has been satisfied.

The manner of morphed conversational answering via agent hierarchy of varied granularity described herein is unavailable in the presently available methods. A method of an embodiment described herein, when implemented to execute on a device or data processing system, comprises substantial advancement of the functionality of that device or data processing system in providing answers that are not only precise as to the question being asked but also provide information that is likely to be relevant given the context of the question and the conversation in which the question arose, and is therefore likely to be response to the user's interests in a human-like manner.

The illustrative embodiments are described with respect to certain types of subject-matter domains, corpora, questions, contexts, conversations, grammatical forms, answers, confidence values, evidence, propagation, hierarchies, morphing, conditions, training, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
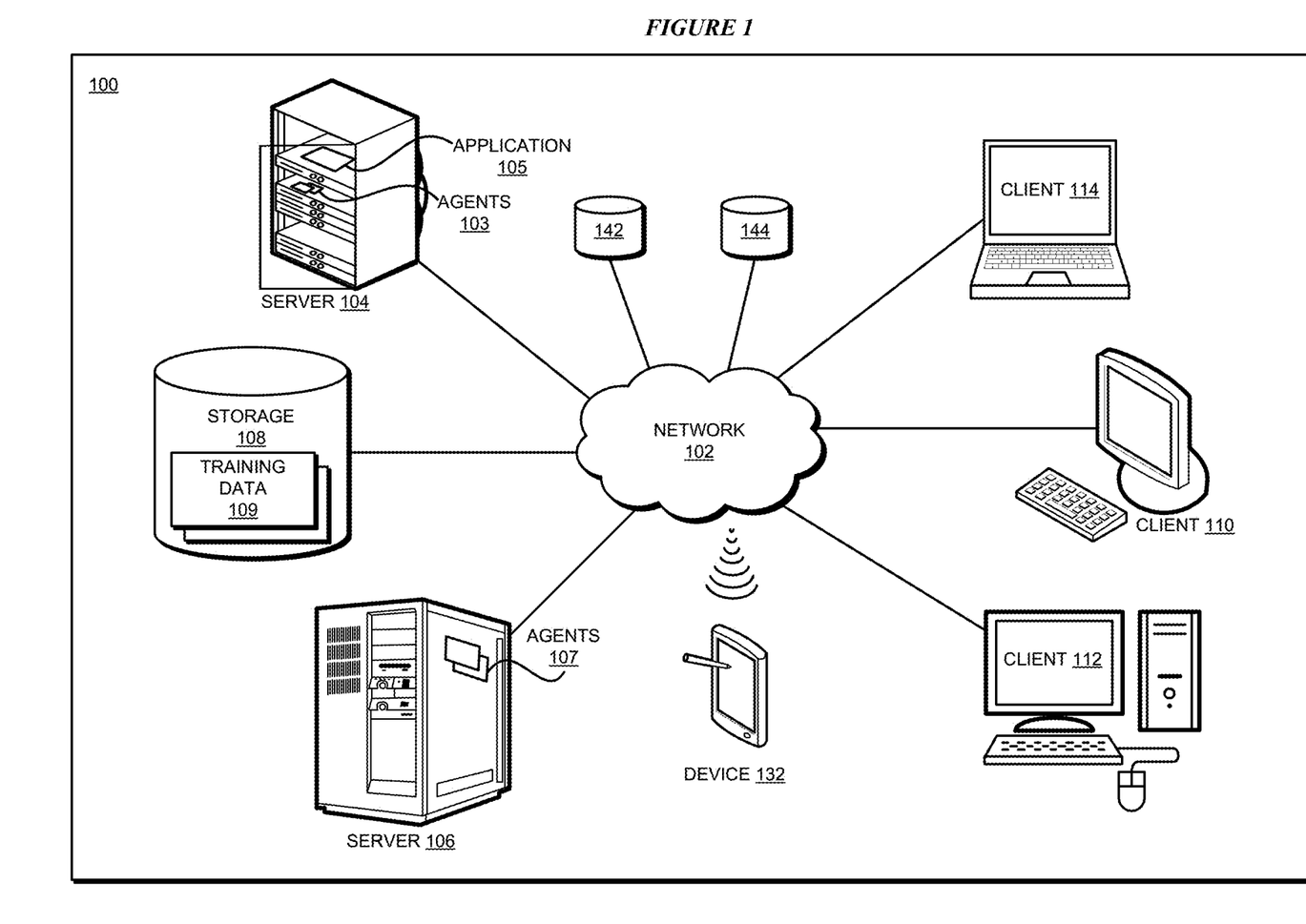
FIG. 1 depicts a block diagram of a network of data processing systems in which illustrative embodiments may be implemented.
Figure 2:
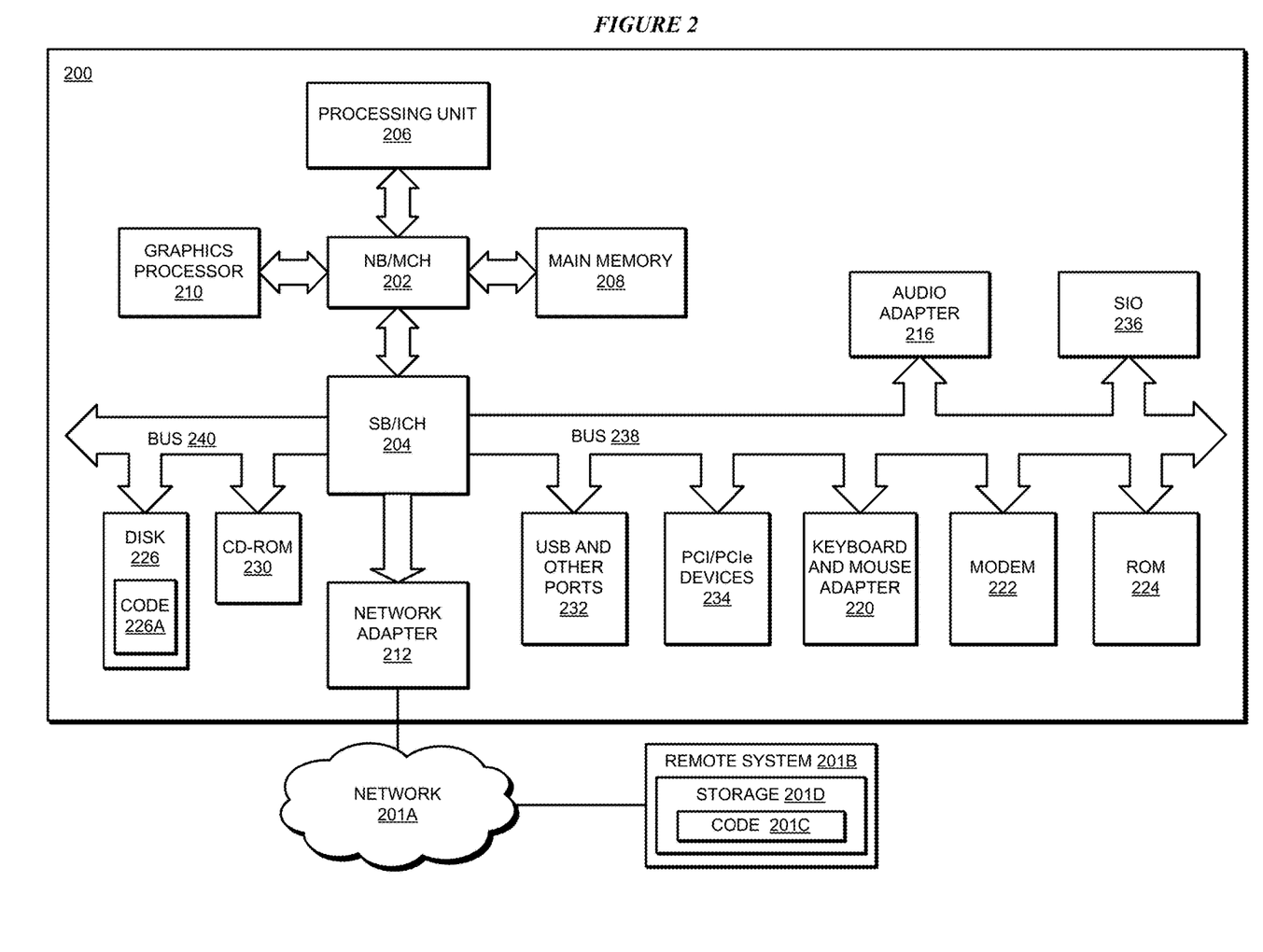
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Agents 103 and 107 may be distributed across network 102 in any suitable manner. Application 105 trains and organizes agents 103 and 107 in an agent hierarchy. Application 105 uses training data 109 to train one or more agents 103 and/or 107. An agent, such as agent 103 builds a corpus of knowledge about an assigned portion of a subject-matter domain by receiving data from one or more data sources. Data sources 142 and 144 are examples of such data sources.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105, and agents 103 and 107, in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
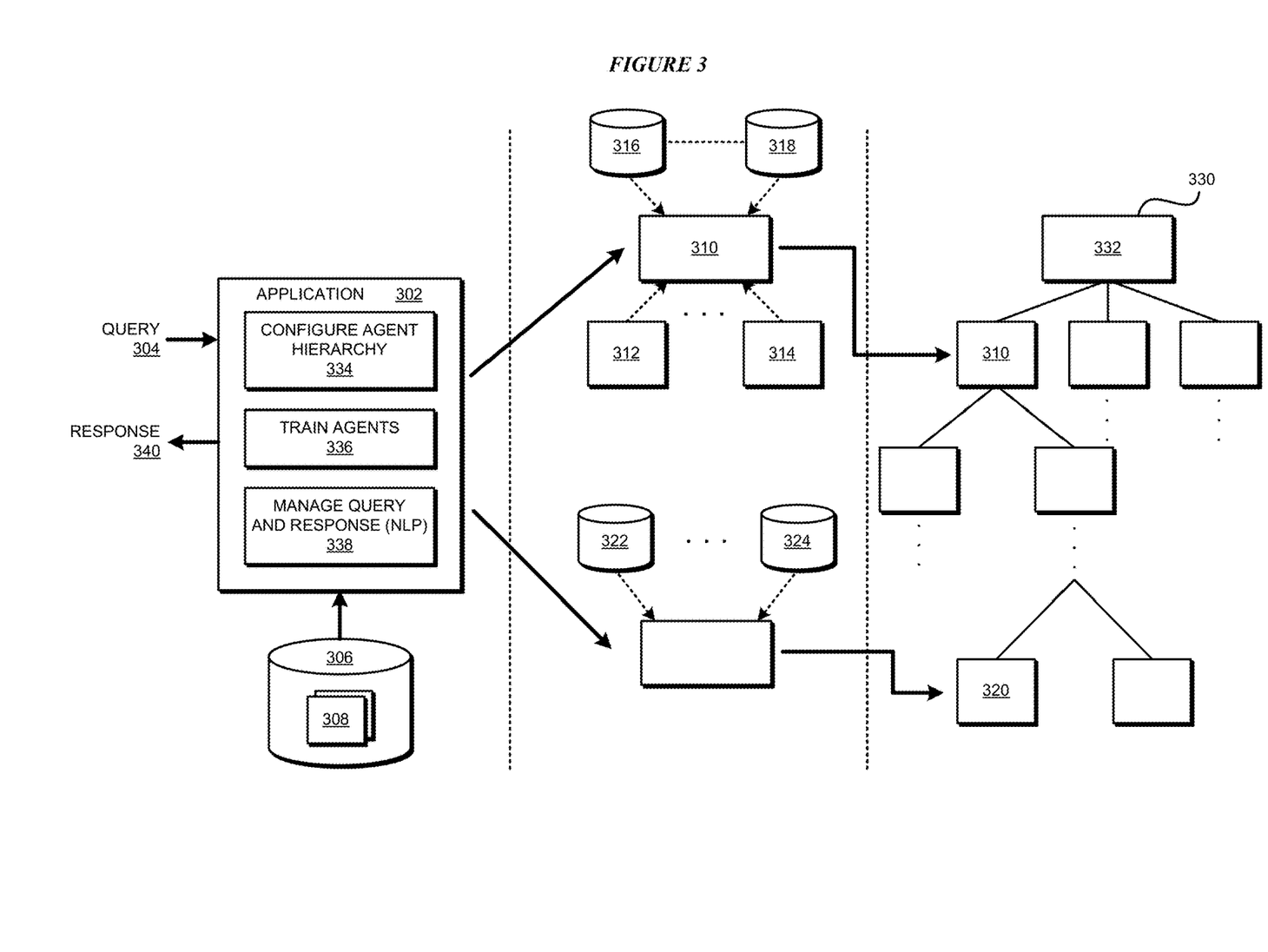
FIG. 3 depicts a block diagram of an example configuration for morphed conversational answering via agent hierarchy of varied granularity in accordance with an illustrative embodiment.

With reference to FIG. 3, this figure depicts a block diagram of an example configuration for morphed conversational answering via agent hierarchy of varied granularity in accordance with an illustrative embodiment. Application 302 is an example of application 105 in FIG. 1. Query 304 is a question asked during a conversation. Repository 306 includes training data 308 similar to training data 109 in FIG. 1.

Agent 310 is an example of an intermediate level agent, such as agent x described in an example herein. Any number of agents 312-314 are lower agents to agent 310, whose answers agent 310 morphs. Agent 310 uses data received from any number and types of data sources 316-318 to build a corpus of knowledge for the portion of subject-matter domain for which agent 310 is responsible.

Agent 320 is an example of a leaf-node level agent, as described herein. Agent 320 uses data received from any number and types of data sources 322-324 to build a corpus of knowledge for the portion of subject-matter domain for which agent 320 is responsible.

Agents 310 and 320 are examples of agents that participate in agent-hierarchy 330, which has agent 332 as the root node. Agent 310 is depicted as an intermediate level node in agent-hierarchy 330. Agent 320 is depicted as a leaf level node in agent-hierarchy 330.

Component 334 configures agent-hierarchy 330. Component trains the agents, such as agents 310 and 320, that participate in agent-hierarchy 330, in a manner described herein. Component 338 performs any pre-processing, such as NLP, of query 304 received from a user. Component 338 submits the processed query to the leaf node agents in hierarchy 330. Component 383 also receives a final morphed response received from root node 332 or an intermediate node in hierarchy 330. Component 338 performs any post-processing, such as NLP, on the response and outputs corresponding processed response 340.

Figure 4:
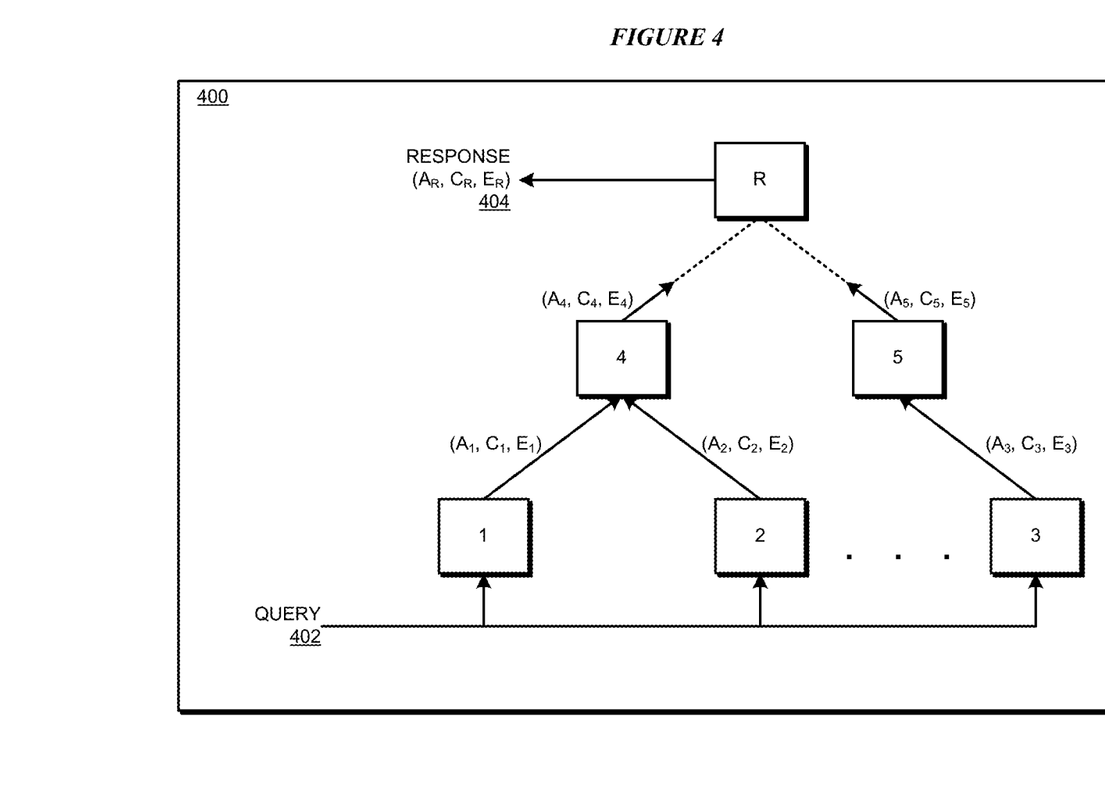
FIG. 4 depicts a block diagram of an agent-hierarchy in operation in accordance with an illustrative embodiment.

With reference to FIG. 4, this figure depicts a block diagram of an agent-hierarchy in operation in accordance with an illustrative embodiment. Hierarchy 400 is an example of hierarchy 330 in FIG. 3. Query 402 is an example of query 304 in FIG. 3. Query 402 comprises a question that has been extracted from a conversation and optionally pre-processed through an NLP engine to be in a suitable form for inputting into hierarchy 400.

Agents 1, 2, and 3 occupy the lowest level leaf nodes in hierarchy 400. Agents 4 and 5 occupy the next higher level—an intermediate level—from agents 1, 2, and 3 in hierarchy 400. Any number of such intermediate levels may exist in hierarchy 400, ultimately reaching the root node, which is occupied by agent R.

Agent 1 receives query 402 and outputs answer (A1,C1,E1) according to a first scope of knowledge of the subject-matter domain to which query 402 pertains. Agent 2 receives query 402 and outputs answer (A2,C2,E2) according to a second scope of knowledge of the subject-matter domain to which query 402 pertains. Agent 3 receives query 402 and outputs answer (A3,C3,E3) according to a third scope of knowledge of the subject-matter domain to which query 402 pertains.

Agent 4 receives answers (A1,C1,E1) and (A2,C2,E2) that are propagated upwards from agents 1 and 2, respectively, to agent 4. Agent 4 receives query 402 through one or more lower agents, e.g., through agent 1. Agent 4 computes another answer at the intermediate level of agent 4, according to a fourth scope of knowledge of the subject-matter domain to which query 402 pertains. Agent 4 them morphs (A1,C1,E1) and (A2,C2,E2) with the answer computed by agent 4. Agent 4 produces morphed answer (A4,C4,E4). Morphed answer (A4,C4,E4) has a variety of granularity at least because the scopes of knowledge of agents 1, 2, and 4 are different within the same subject-matter domain.

Similarly, agent 5 receives answer (A3,C3,E3) and possibly other answers (not shown) that are propagated upwards from agent 3 and other agents (not shown), respectively, to agent 5. Agent 5 produces morphed answer (A5,C5,E5) in a manner similar to agent 4. Morphed answer (A5,C5,E5) also has a variety of granularity at least because the scopes of knowledge of agents 3, other leaf agents (not shown), and agent 5 are different within the same subject-matter domain.

This propagation continues in this non-limiting example depiction until root agent R is reached in hierarchy 400. Agent R produces a final morphed answer (AR,CR,ER) in a manner similar to morphed answers produced by other intermediate agents, such as agents 4 and 5. Morphed answer (AR,CR,ER) has a variety of granularity at least because the scopes of knowledge of agents R, the intermediate agents propagating answers from the various intermediate levels towards the root agent, and the leaf agents such as agents 1-3 are different within the same subject-matter domain.

Final morphed answer (AR,CR,ER) forms response 404 to query 402. Response 404 can be post-processed, such as through an NLP engine, to present to the user in a suitable form, such as in the form of human-understandable audible speech.

Figure 5:
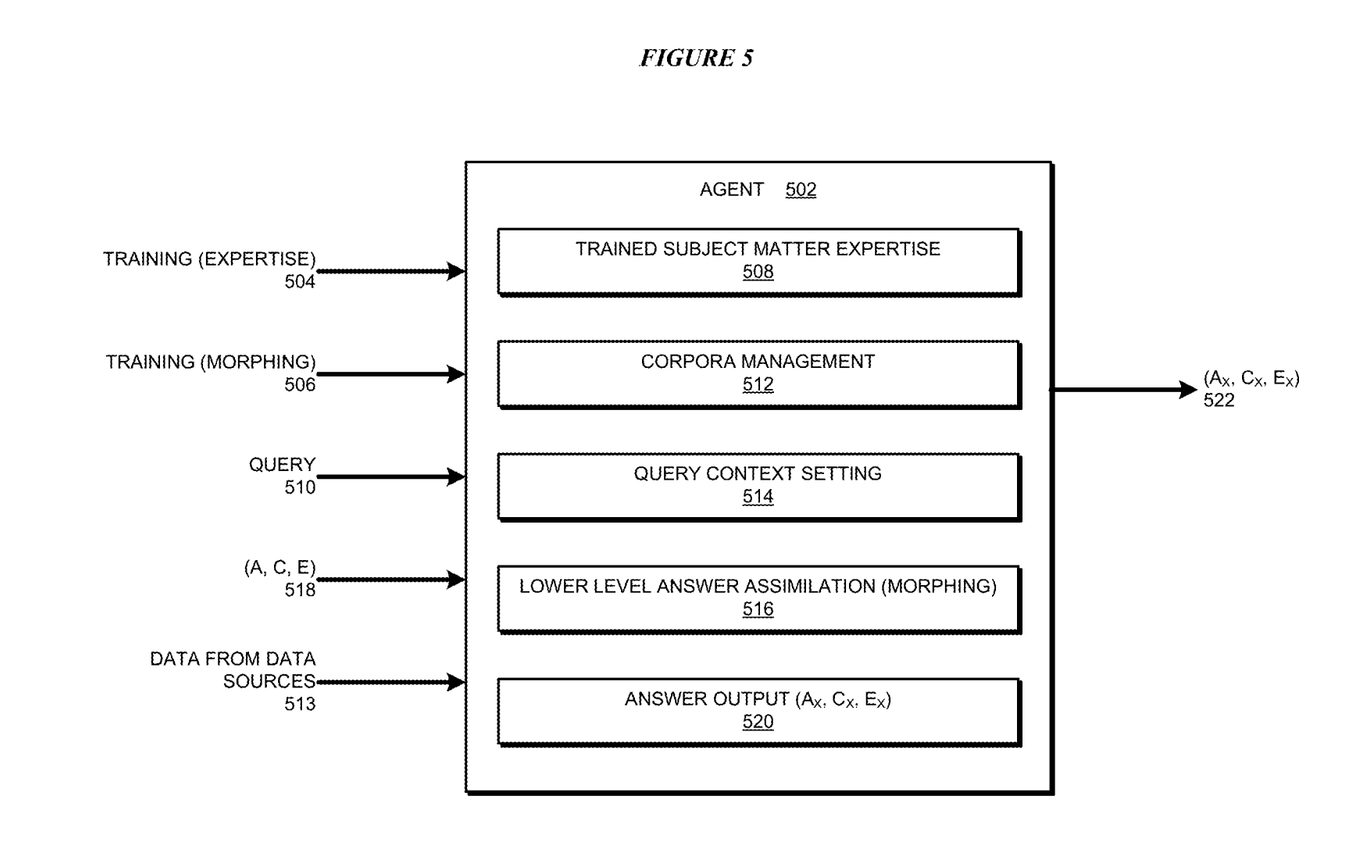
FIG. 5 depicts a block diagram of an agent in accordance with an illustrative embodiment.

With reference to FIG. 5, this figure depicts a block diagram of an agent in accordance with an illustrative embodiment. Agent 502 is usable as any of agents 1, 2, 3, 4, 5, or R in hierarchy 400 in FIG. 4.

Application 302 in FIG. 3, particularly component 336, provides training 504 to agent 502. Specifically, training 504 is the training to impart expertise in answering the questions correctly using the corpus of knowledge within the scope of agent 502. Expertise of an agent is the ability to correctly answer questions relative to the corpora of knowledge available to the agent.

Similarly, component 336 of application 302 in FIG. 3 also provides training 506 to agent 502. Training 506 is a morphing training by which agent 502 learns a correct way of morphing the (A,C,E) answers received from lower agents in the agent hierarchy, with the answer that agent 502 itself computes from the corpus of knowledge available to agent 502.

Training 504 and 506 result in component 508 of agent 502, which comprises a trained engine to answer questions based on the corpus available to agent 502. Some non-limiting examples of component 508 include, but are not limited to a trained neural network, and a cognitive system or subsystem.

Component 508 receives query 510, and computes an answer based on the corpus of agent 502. Component 512 manages the corpus by collecting data 513 from data sources and updating the corpus. Component 514 determines a context of query 510 in a manner described herein, or as propagated upward from a lower level agent.

Component 516 morphs or assimilates lower level (A,C,E) answers with the answer computed by component 508 to compute a morphed answer (Ax,Cx,Ex) (assuming agent 502 is agent x). Component 520 produces final morphed output 522 comprising (Ax,Cx,Ex).

Figure 6:
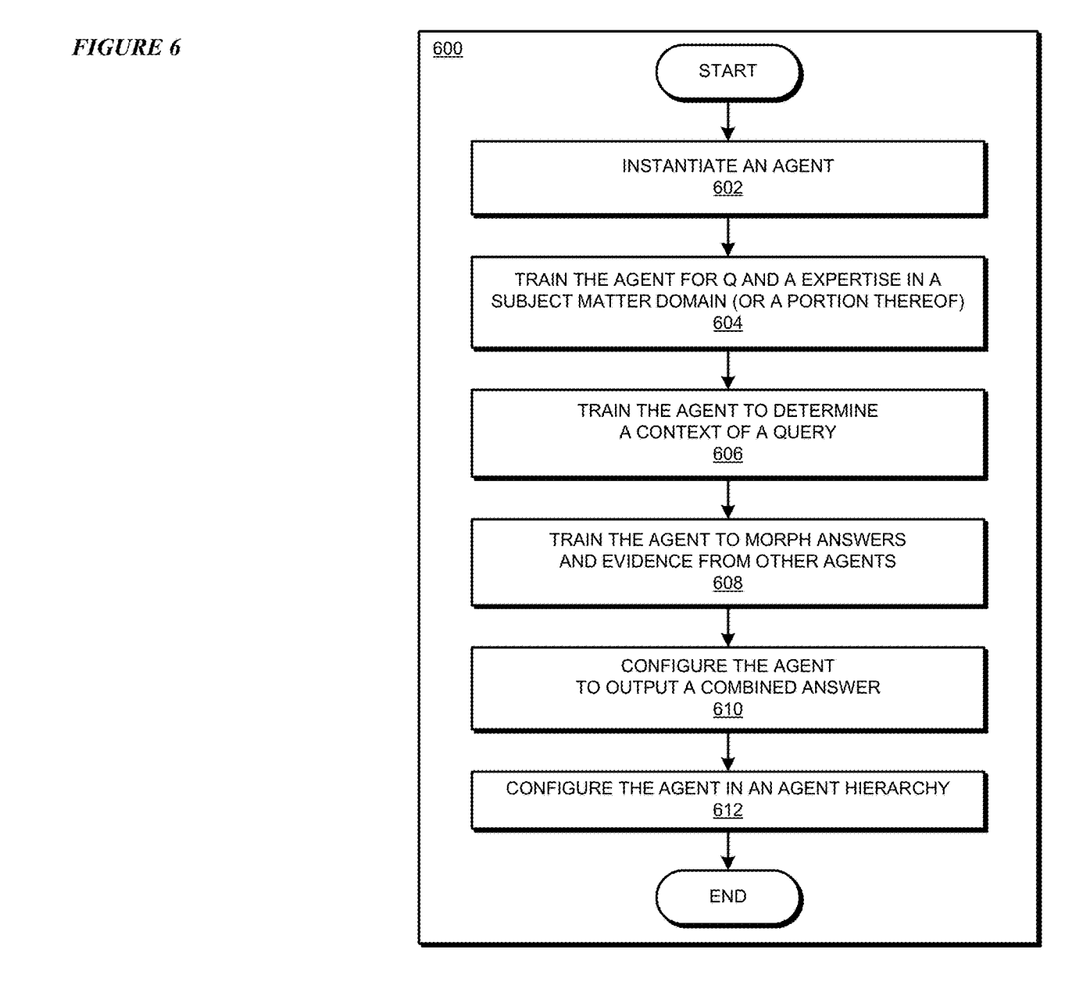
FIG. 6 depicts a flowchart of an example process of configuring an agent hierarchy in accordance with an illustrative embodiment.

With reference to FIG. 6, this figure depicts a flowchart of an example process of configuring an agent hierarchy in accordance with an illustrative embodiment. Process 600 can be implemented in application 302 in FIG. 3.

The application instantiates an agent (block 602). The application trains the agent for question and answer (Q and A) expertise in a portion of a subject-matter domain (block 604). The application also trains the agent to determine the context of the question from a conversation (block 606).

The application trains the agent to morph answers and evidence from other agents when such other agents propagate their answers to the agent (block 608). The application trains the agent to output a combined answer, i.e., the agent's final morphed answer (block 610). The application configures the agent in an agent-hierarchy according to an ontology of the subject-matter (block 612). The application ends process 600 thereafter, or returns to block 602 to train and configure more agents in a similar manner.

Figure 7:
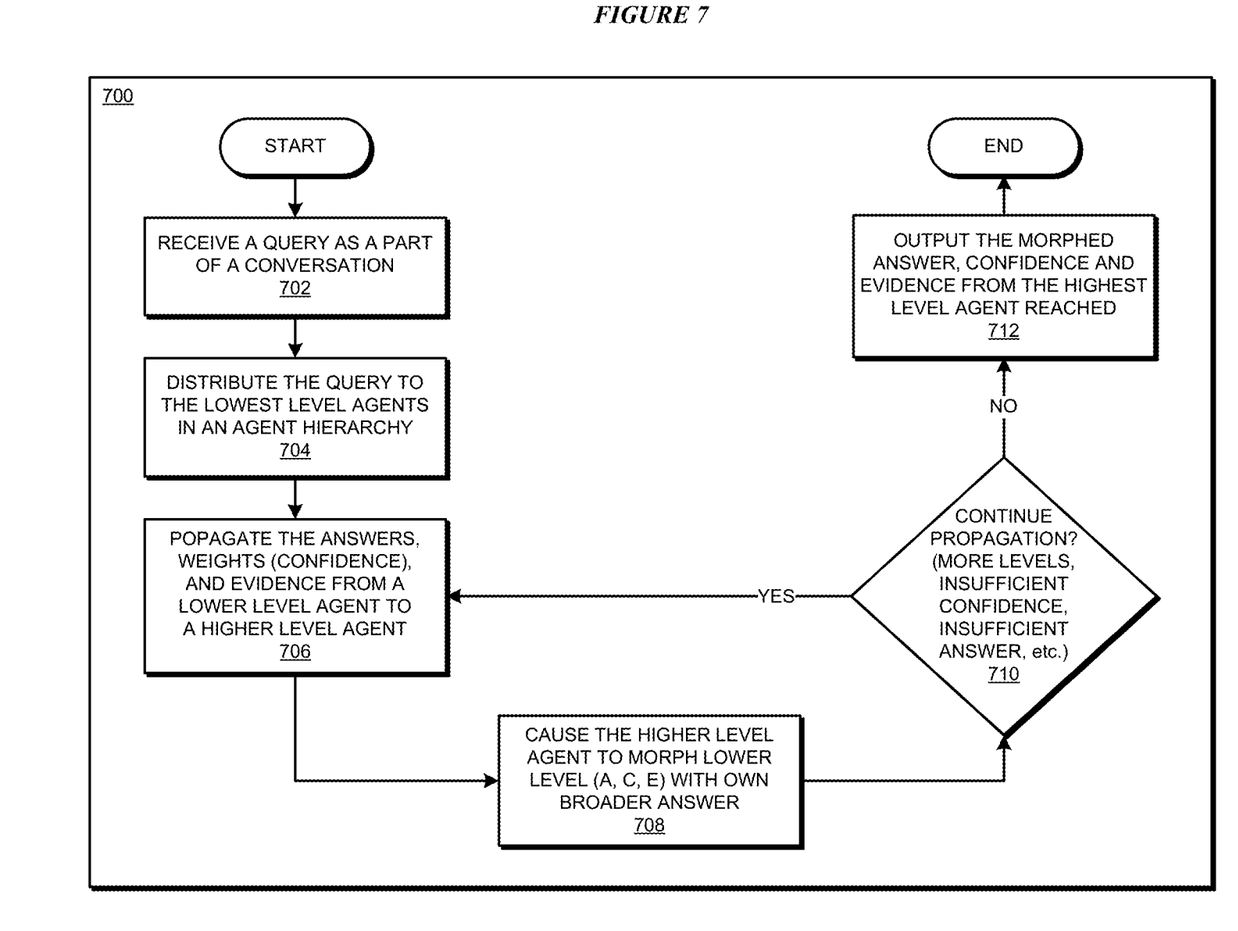
FIG. 7 depicts a flowchart of an example process for morphed conversational answering via agent hierarchy of varied granularity in accordance with an illustrative embodiment.

With reference to FIG. 7, this figure depicts a flowchart of an example process for morphed conversational answering via agent hierarchy of varied granularity in accordance with an illustrative embodiment. Process 700 can be implemented in agent-hierarchy 400 in FIG. 4.

The hierarchy receives a query or question that is a part of a conversation (block 702). The hierarchy distributes the query to a set of lowest-level agents (block 704).

The hierarchy propagates the answers, weights or confidence values, and evidence (A,C,E) from a lower level agent to an agent at the next higher level in the hierarchy (block 706). The hierarchy causes the higher level agent to morph the lower level agent answers with the higher level agent's computed answer (block 708).

The hierarchy determines whether the propagation should continue upwards through higher levels of the hierarchy (block 710). For example, the propagation may not continue if the root agent at the highest level has been reached, or if a user-specified condition about the confidence, answer, or evidence has been satisfied by an intermediate level morphed answer.

If the propagation should continue ("Yes" path of block 710), process 700 returns to block 706. If the propagation can stop ("No" path of block 710), the hierarchy outputs the morphed (A,C,E) answer from the highest level agent or agents that was/were reached (block 712). Process 700 ends thereafter.

Thus, a computer implemented method, system or apparatus, and computer program product are provided in the illustrative embodiments for morphed conversational answering via agent hierarchy of varied granularity and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising: pre-processing a question using Natural Language Processing (NLP), wherein the NLP transforms the question from audible speech to text; constructing, a hierarchy of agents from a set of agents, wherein each agent in the hierarchy is a software agent and is configured to perform at least two functions—(i) answer the question according to a corresponding corpus associated with the agent, the corresponding corpus containing a portion of knowledge about a subject-matter, and (ii) morph the agent's own answer with a different answer produced by a different agent; submitting the question to a first subset of agents, the agents in the first subset being software agents occupying a first level in the hierarchy; propagating, from a first agent in the first subset, a first answer to a second agent in a second subset of agents, the second subset of agents being software agents, the first agent computing the first answer using a first portion of knowledge about the subject-matter; morphing to form a first morphed answer, by adding to the first answer, a second answer, the second answer being computed by the second agent using a second portion of knowledge about the subject-matter; producing, responsive to the question, the first morphed answer; propagating the first morphed answer to a third agent in a third subset, wherein the second subset of agents occupy a second level in the hierarchy, the second level being higher than the first level; morphing, to form a second morphed answer, the first morphed answer with a third answer, the third answer being produced from the third agent in the third subset of agents, wherein the third subset of agents occupy a third level in the hierarchy, the third level being higher than the second level; and producing, responsive to the question, the second morphed answer.

2. The method of claim 1, wherein the third level is a root level of the hierarchy, and wherein a plurality of intermediate levels is configured between the second level and the third level.

3. The method of claim 1, further comprising:
instantiating an agent as the second agent in the set of agents;
training, for subject-matter expertise, the second agent using training data, wherein the training data has a scope of the second portion of knowledge about the subject-matter;
training, for morphing lower-level agent answers, the second agent using training lower-level answers, wherein a training lower-level answer has a granularity of the first answer; and
configuring the second agent in the hierarchy.

4. The method of claim 1, further comprising:
computing, at the first agent, using a first corpus of the first agent, an answer responsive to the question, wherein the first corpus includes the first portion of knowledge about the subject-matter;
computing, at the first agent, a first weight corresponding to the first answer;
extracting from the first corpus of the first agent, a first evidence, wherein the first evidence supports the first answer; and
combining, at the first agent, to form the first answer, the computed answer, the first weight, and the first evidence.

5. The method of claim 1, further comprising:
propagating, from a third agent in the first subset, to the second agent, a third answer;
determining as a part of the morphing, at the second agent, that a weight associated with the third answer is below a threshold weight; and
omitting the third answer in forming the first morphed answer.

6. The method of claim 1, wherein the second portion of knowledge about the subject-matter is broader in scope than the first portion of knowledge about the subject-matter.

7. The method of claim 1, further comprising:
arranging the agents in the hierarchy according to an ontology of the subject-matter, wherein the agents in the first subset correspond to a set of leaf nodes in the ontology, and wherein a scope of knowledge of the first agent corresponds to a first leaf-node term in the ontology.

8. The method of claim 1, further comprising:
post-processing the first morphed answer using NLP, wherein the NLP transforms the first morphed answer into audible speech.

9. A computer usable program product comprising one or more computer-readable storage devices, and program instructions stored on at least one of the one or more storage devices, the stored program instructions comprising: program instructions to pre-process a question using Natural Language Processing (NLP), wherein the NLP transforms the question from audible speech to text; program instructions to construct, a hierarchy of agents from a set of agents, wherein each agent in the hierarchy is a software agent and is configured to perform at least two functions
(i) answer the question according to a corresponding corpus associated with the agent, the corresponding corpus containing a portion of knowledge about a subject-matter, and (ii) morph the agent's own answer with a different answer produced by a different agent; program instructions to submit the question to a first subset of agents, the agents in the first subset being software agents occupying a first level in the hierarchy; program instructions to propagate, from a first agent in the first subset, a first answer to a second agent in a second subset of agents, the second subset of agents being software agents, the first agent computing the first answer using a first portion of knowledge about the subject-matter; program instructions to morph to form a first morphed answer, by adding to the first answer, a second answer, the second answer being computed by the second agent using a second portion of knowledge about the subject-matter; producing, responsive to the question, the first morphed answer; propagating the first morphed answer to a third agent in a third subset, wherein the second subset of agents occupy a second level in the hierarchy, the second level being higher than the first level; morphing, to form a second morphed answer, the first morphed answer with a third answer, the third answer being produced from the third agent in the third subset of agents, wherein the third subset of agents occupy a third level in the hierarchy, the third level being higher than the second level; and producing, responsive to the question, the second morphed answer.

10. The computer usable program of claim 9, wherein the third level is a root level of the hierarchy, and wherein a plurality of intermediate levels is configured between the second level and the third level.

11. The computer usable program of claim 9, further comprising:
program instructions to instantiate an agent as the second agent in the set of agents;
program instructions to train, for subject-matter expertise, the second agent using training data, wherein the training data has a scope of the second portion of knowledge about the subject-matter;
program instructions to train, for morphing lower-level agent answers, the second agent using training lower-level answers, wherein a training lower-level answer has a granularity of the first answer; and
program instructions to configure the second agent in the hierarchy.

12. The computer usable program of claim 9, further comprising:

program instructions to compute, at the first agent, using a first corpus of the first agent, an answer responsive to the question, wherein the first corpus includes the first portion of knowledge about the subject-matter;
program instructions to compute, at the first agent, a first weight corresponding to the first answer;
program instructions to extract from the first corpus of the first agent, a first evidence, wherein the first evidence supports the first answer; and
program instructions to combine, at the first agent, to form the first answer, the computed answer, the first weight, and the first evidence.

13. The computer usable program of claim 9, further comprising:
program instructions to propagate, from a third agent in the first subset, to the second agent, a third answer;
program instructions to determine as a part of the morphing, at the second agent, that a weight associated with the third answer is below a threshold weight; and
program instructions to omit the third answer in forming the first morphed answer.

14. The computer usable program of claim 9, wherein the second portion of knowledge about the subject-matter is broader in scope than the first portion of knowledge about the subject-matter.

15. The computer usable program product of claim 9, wherein the program instructions are stored in a computer readable storage device in a data processing system, and wherein the program instructions are transferred over a network from a remote data processing system.

16. The computer usable program product of claim 9, wherein the program instructions are stored in a computer readable storage device in a server data processing system, and wherein the program instructions are downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising: program instructions to pre-process a question using Natural Language Processing (NLP), wherein the NLP transforms the question from audible speech to text; program instructions to construct, a hierarchy of agents from a set of agents, wherein each agent in the hierarchy is a software agent and is configured to perform at least two functions—(i) answer the question according to a corresponding corpus associated with the agent, the corresponding corpus containing a portion of knowledge about a subject-matter, and (ii) morph the agent's own answer with a different answer produced by a different agent; program instructions to submit the question to a first subset of agents, the agents in the first subset being software agents occupying a first level in the hierarchy; program instructions to propagate, from a first agent in the first subset, a first answer to a second agent in a second subset of agents, the second subset of agents being software agents, the first agent computing the first answer using a first portion of knowledge about the subject-matter; program instructions to morph to form a first morphed answer, by adding to the first answer, a second answer, the second answer being computed by the second agent using a second portion of knowledge about the subject-matter; producing, responsive to the question, the first morphed answer; propagating the first morphed answer to a third agent in a third subset, wherein the second subset of agents occupy a second level in the hierarchy, the second level being higher than the first level; morphing, to form a second morphed answer, the first morphed answer with a third answer, the third answer being produced from the third agent in the third subset of agents, wherein the third subset of agents occupy a third level in the hierarchy, the third level being higher than the second level; and producing, responsive to the question, the second morphed answer.

* * * * *